United States Patent
Beckey

(10) Patent No.: US 7,325,574 B1
(45) Date of Patent: Feb. 5, 2008

(54) RUPTURE DISC ASSEMBLY FOR PNEUMATIC PLUGS

(75) Inventor: Thomas J. Beckey, Edina, MN (US)

(73) Assignee: Cherne Industries Incorporated, Minneapolis, MN (US)

( * ) Notice: Subject to any disclaimer, the term of this patent is extended or adjusted under 35 U.S.C. 154(b) by 248 days.

(21) Appl. No.: 11/103,084

(22) Filed: Apr. 11, 2005

Related U.S. Application Data

(60) Provisional application No. 60/562,011, filed on Apr. 13, 2004.

(51) Int. Cl.
   *F16L 55/12* (2006.01)
(52) U.S. Cl. .................................................. 138/93
(58) Field of Classification Search ................... 138/93
   See application file for complete search history.

(56) References Cited

U.S. PATENT DOCUMENTS

| | | | |
|---|---|---|---|
| 2,922,544 A * | 1/1960 | Hibbard et al. ............ 220/89.2 |
| 2,952,383 A * | 9/1960 | Paxton et al. ............. 220/89.2 |
| 3,653,684 A * | 4/1972 | Plumer ...................... 280/734 |
| 3,902,528 A | 9/1975 | Tartabini et al. |
| 4,263,929 A * | 4/1981 | Kearney ................... 137/68.18 |
| 4,270,560 A * | 6/1981 | Kearney ................... 137/68.14 |
| 4,614,206 A | 9/1986 | Mathison et al. |
| 4,790,356 A | 12/1988 | Tash |
| 5,076,328 A | 12/1991 | Lyon |
| 5,370,147 A * | 12/1994 | Brusse et al. ............ 137/15.11 |
| 5,526,878 A | 6/1996 | Duell et al. |
| 5,609,362 A * | 3/1997 | Sparks et al. ............. 280/741 |
| 5,615,741 A | 4/1997 | Coronado |
| 5,718,288 A * | 2/1998 | Bertet et al. ............... 166/287 |
| 5,867,547 A * | 2/1999 | Lee .......................... 376/204 |
| 6,651,743 B2 | 11/2003 | Szarka |

OTHER PUBLICATIONS

Zook Enterprises, Rupture Disks, website catalog, 2004, Chagrin Falls, OH, USA.

* cited by examiner

*Primary Examiner*—James Hook
(74) *Attorney, Agent, or Firm*—Anthony G. Eggink; Katrina M. Eggink

(57) ABSTRACT

A rupture disc assembly for pneumatic plugs constructed and arranged to cooperate with an aperture in an end casting of the plug to expel excess air from the plug interior when a predetermined internal plug pressure is reached. The rupture disc assembly utilizes a rupturable member in a flanged holder structure positioned in communication with the end casting aperture.

20 Claims, 6 Drawing Sheets

RUPTURE DISC ASSEMBLY FOR PNEUMATIC PLUGS

This application claims the benefit of U.S. Provisional Patent Application No. 60/562,011, filed on Apr. 13, 2004.

BACKGROUND OF THE INVENTION

This invention relates generally to a rupture disc assembly to vent pressure from an inflatable system. Particularly, the invention relates to a rupture disc assembly for use with pneumatic pipeline plugs to vent air at a predetermined internal plug pressure to thereby prevent overinflation of the pneumatic plug.

Pneumatic plugs are constructed to be inflated to a desired pressure and any undue excess pressure may cause damage to the plug and cause possible injury to the user and surroundings. A long felt need exists in the pipe plug art to relieve excess pressure at a specified pressure reading. In the past, the alternatives have primarily been read-back pressure gauges and pressure relief valves, however, both the reliance on pressure gauges and on pressure relief valves have not been adequate.

Read back pressure gauges are typically not sufficient because they may be broken and/or out of calibration and do not inherently prevent over inflation. Read back gauges also require operator intervention and therefore, are limited in their effectiveness to prevent pneumatic plug overinflation.

Pressure relief valves have also been found to not be particularly suited for pneumatic pipe plug applications because they typically were unable to bypass sufficient fluid flow once they start to open. One reason for this is that the spring-loaded steel ball used to seal the valve unit blocks the air flow once it starts to open, thus, drastically reducing the air flow for a given orifice diameter. The pressure relief valve, therefore, does not effectively allow large airflows until high pressure differentials are achieved, i.e., the steel ball is completely pushed out of the way of the air flow. There is a need to bypass large flow values at low pressure differentials as opposed to high pressure differentials.

A further reason pressure relief valves are not suitable for use in inflatable pipe plugs is that such relief valves are subject to leakage due to contamination of the valve seal. The application of using inflatable plugs is often very dirty and debris is very likely to get into the sealing area and cause the valve to leak slowly, ultimately causing the plug to dislodge from the pipeline, and potentially causing damage and injury. Thus, a need exists in the pneumatic pipeline sealing plug art to provide a reliable means to prevent over inflation.

The rupture disc assembly of the present invention prevents overinflation of inflatable sewer plugs by utilizing a disc or like structure that is constructed to rupture at a specified pressure which is below the ultimate burst pressure of the plug. The resultant opening in the ruptured disc and holder structure is of sufficient size to bypass the air coming from the compressor used to inflate the plug so that the ultimate burst pressure of the plug is not reached.

The utilization of a rupture disc overcomes the shortcomings of the pressure relief valves of the prior art. When the disc ruptures, the large orifice created is capable to bypass large quantities of air much more efficiently than a pressure relief valve.

SUMMARY OF THE INVENTION

The present invention provides a vent rupture disc assembly for pneumatic plugs. The rupture disc assembly of the invention may be mounted on 15-30" plug end castings, for example. The rupture disc assembly may be provided in several embodiments. The assembly includes a disc holder body having a flanged structure for holding a rupturable disc. The disc holder body may be internally flanged to hold a rupturable disc in a sealed state. The holder body is constructed and arranged to communicate with the interior of the pipeline plug. In one embodiment the assembly is provided on the interior of the plug body and is constructed and arranged to cooperate with an end casting of the plug. In another embodiment the rupture disc assembly is provided on the exterior of the plug body and is constructed and arranged to cooperate with the inflation port of an end casting of the plug. The rupture disc assembly is preferably mounted in the pneumatic plug in a tamper resistant manner so that once ruptured the plug can no longer be utilized.

Pneumatic plugs typically have a safety factor of at least twice the required inflation pressure, for example. The ultimate burst pressure therefore is greater than twice the required inflation pressure. The rupture disc of the invention is preferably set to rupture at approximately 90% of twice the required inflation pressure. This setting is to prevent nuisance ruptures from slight overinflation due to gauge inaccuracies and testing in vacuum conditions. For example, a 24-48" pneumatic plug may have a required inflation pressure of 22 psi, for example. With a safety factor, this plug's ultimate burst pressure would be greater than 44 psi. The rupture disc is preferably set to rupture at 40 psi (0.9×2×22 psi=40 psi), for example.

The rupture disc may be constructed of a wafer-like structure that is held in an internally flanged holder structure that is positioned adjacent to an aperture in the plug end casting. The disc wafer like structure may be constructed of a graphite composition or other rupturable material. The disc structure may be machined to have a uniform or a varying thickness configuration, i.e., different thicknesses between the central portion and the periphery or a disc structure tapering inward from the periphery from ¼ to ¹⁄₁₆ inches so that the disc bursts at a predetermined pressure. The cross-sectional thickness may be varied, for example, to provide a rupturable structure at a predetermined pressure. Alternatively, the disc structure may be constructed of a rigid material having scored areas such as scored lines designed for rupture at a predetermined pressure. The disc structure may also have a flat or a concave cross-sectional configuration. The rupture disc may be provided in a disc holder body structure having an internally flanged portion which is constructed and arranged to be mounted to the end casting of the pneumatic plug. The rupture disc is positioned in the holder structure so that it does not leak until it ruptures. A rubber O-ring positioned between the rupture disc and the metal disc holder is provided for an air-tight seal.

In the second embodiment, the inflation air may enter through the inflator of the crow's foot and goes directly into the plug. If the pressure exceeds the specified pressure, the disc ruptures and the compressor airflow is bypassed out the side of the holder device through an orifice to the atmosphere. Tamper-proof bolts and an elongated cover may be used to prevent the disc from rotating so that the device cannot be removed from the plug.

These and other benefits of this invention will become clear from the following description by reference to the drawings.

DESCRIPTION OF THE PREFERRED EMBODIMENTS

Figure 1:
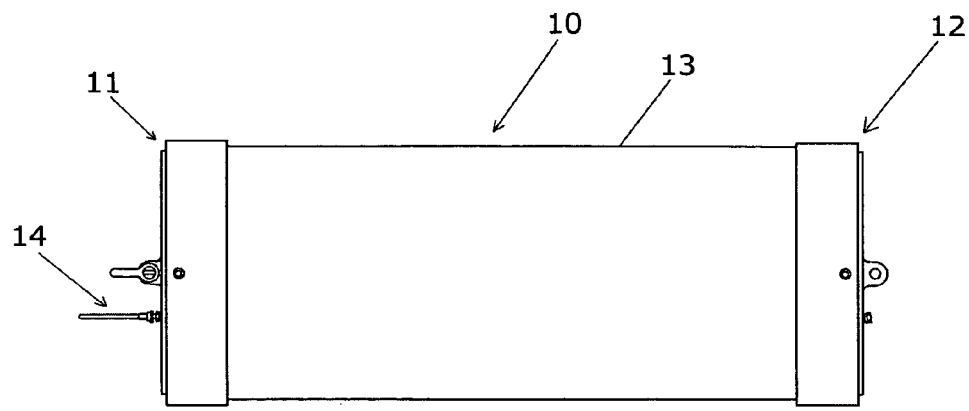
FIG. 1 is a lateral plan view of a pneumatic pipeline plug having end castings and a flexible sleeve structure.
Figure 2:
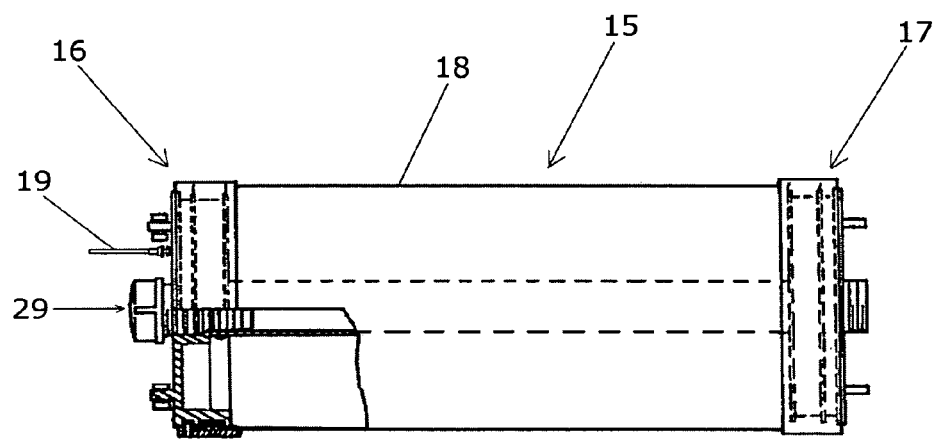
FIG. 2 is a lateral plan view of a pneumatic plug having a by-pass conduit.

FIGS. 1 and 2 are lateral views showing pneumatic pipeline plugs 10 and 15 used to seal pipelines. The rupture disc assemblies of the present invention are constructed and arranged to be utilized in connection with pneumatic plugs and which are generally designated as plugs 10 and 15. The pneumatic plug 10 may typically have end castings 11 and 12 which hold a flexible elastomeric sleeve 13 therebetween. Plugs 10 and 15 are exemplary showings of pneumatic plugs and do not specifically show the end castings shown in the subsequent drawing figures. Pneumatic plug 15 is shown to have end castings 16 and 17 and between which elastomeric sleeve 18 is held. Inflator 14 extends from and casting 11 and is used to inflate and deflate the plug 10. The plug 15 is shown to have a by-pass conduit 29. Inflator 19 is shown extending from end casting 16.

Figure 3:
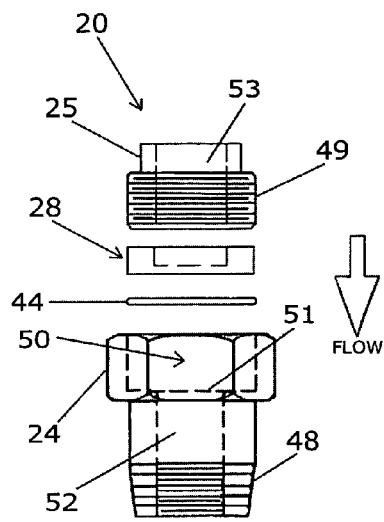
FIG. 3 is a lateral plan view of the rupture disc assembly of the invention.
Figure 4:
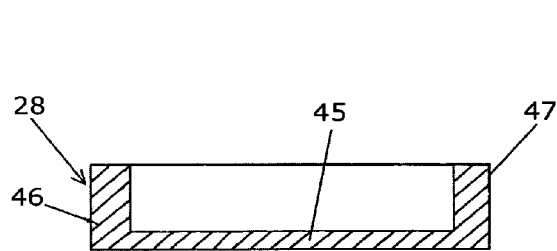
FIG. 4 is a sectional view of the rupture disc of FIG. 3.
Figure 6:
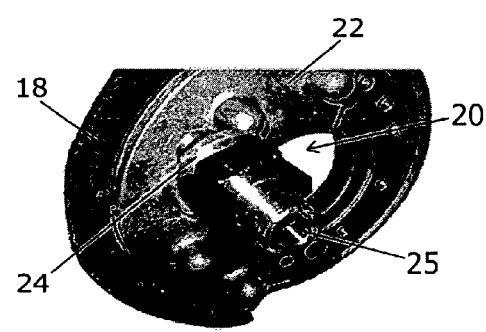
FIG. 6 is a rear view of the rupture disc holder of FIG. 5.

Referring to FIGS. 3 and 4, the rupture disc assembly 20 is shown comprised of disc holder structure 24 having a threaded end 48 for attachment to the end casting of a pneumatic plug, for example. The disc holder 24 has a bore 52 therethrough and an interior opening or cavity 50 having a peripheral shoulder or flange 51 for receiving rupture disc 28 and a threaded plug 25 with a bore or vent opening 25. An O-ring 44 is provided so that when assembled the assembly 20 sealingly secures the rupture disc 28 within the holder 24, secured by outlet plug 25. FIG. 4 is a sectional view showing the rupture disc 28 having a disc portion 45 and a peripheral portion 46. The rupture disc 28 may be a cylindrical structure having a round or disc portion 45 and peripheral portion 46. The rupture disc 28 is constructed and arranged to rupture or break apart at a predetermined pressure. A label or tag 47 may be affixed to the outside of the peripheral portion 46 to indicate the rated rupture pressure of the disc. The rupture disc 28 may be constructed of a graphite composition or like rupturable material. An exemplary rupture disc assembly 20 may include a rupture disc 28 having an approximately 0.875 inch ID disc portion 45, a peripheral portion 46 having an approximately 1.430 inch O.D. and an approximate 0.25 inch height and which is held within a holder body 24 having an approximately 0.75 inch ID outlet with 0.75 inch NPT threads and an outlet conduit having an approximately 0.875 inch ID and which threads into the holder body 24. An O-ring 44 constructed of Buna rubber may be provided to sealingly hold the rupture disc 28 within the assembly 20.

The rupture disc assemblies of the invention may be incorporated into an end casting of the pneumatic plug. Exemplary rupture disc assemblies are shown in the drawings, for example, FIGS. 3-9 show a rupture disc assembly 20 which is mounted in the interior of the pneumatic plug and FIGS. 10-14 show a rupture disc assembly 30 which is mounted on the exterior of the end casting of the pneumatic plug. The rupture disc assemblies operate on generally the same principle in that each assembly cooperates with an aperture in the end casting of the pneumatic plug to expel excess air pressure from the plug interior when a predetermined internal plug pressure is reached. The internally positioned rupture disc assembly is preferred in that contamination and tampering difficulties are reduced.

Figure 5:
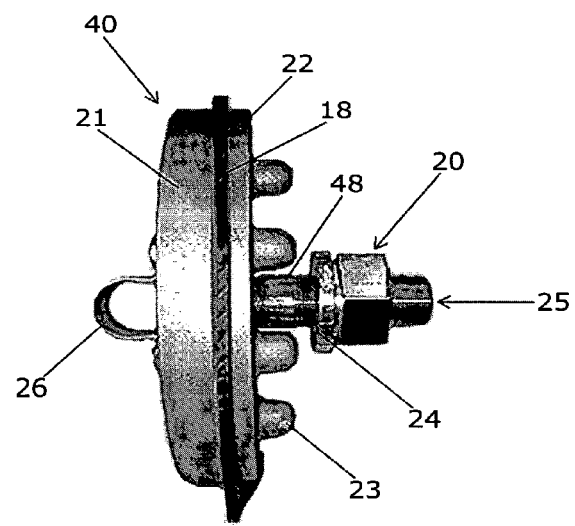
FIG. 5 is a lateral plan view showing the rupture disc holder mounted to the interior of a plug casting.
Figure 7:
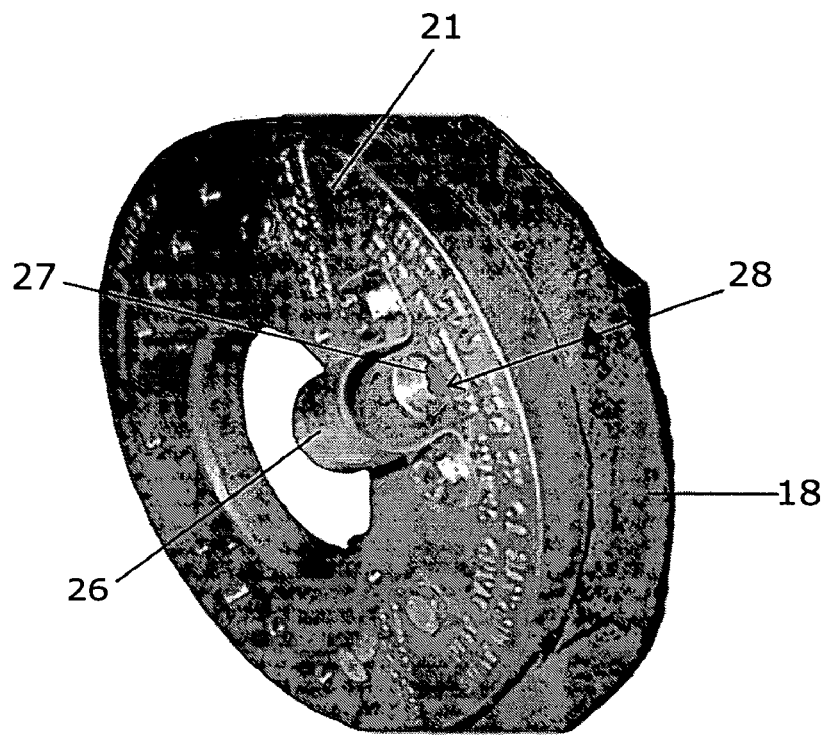
FIG. 7 is a frontal view of the rupture disc holder of FIG. 5.
Figure 8:
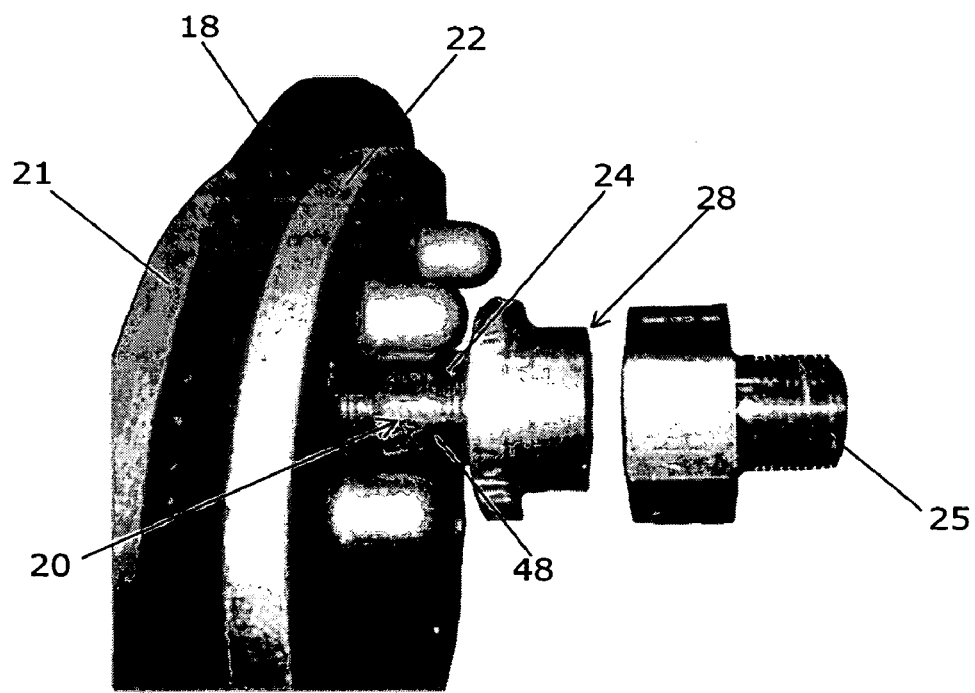
FIG. 8 is a lateral close-up view showing the rupture disc holder of FIG. 5.

Referring to FIGS. 3-9, a vent rupture disc holder assembly 20 of the invention is shown operative through end casting 40. End casting 40 is shown comprised of exterior casting 21 and interior casting 22 and between which elastomeric sleeve 18 is held by means of bolts and bolt thread cavities 23, for example. The holder assembly includes a disc holder body 24 which is shown extending from interior casting 22 and which is aligned with aperture 27 in exterior casting 21. Vent conduit 25 is shown extending from disc holder body 24 and into the plug interior. The assembly 20 may be threaded to the interior casting 22 as shown in FIGS. 5 and 8. Although the internally flanged body is shown threaded into the pneumatic plug end plate, the internally flanged body may also be adjacent and connected to the non-flanged body that is threaded into the plug end plate, for example. The rupture disc would in the latter configuration be appropriately positioned for bursting. For example, a domed shaped rupture disc would be positioned so that the concave central portion is faced in the direction of the pressure flow to thereby concentrate pressure within the concave disc portion.

Figure 9:
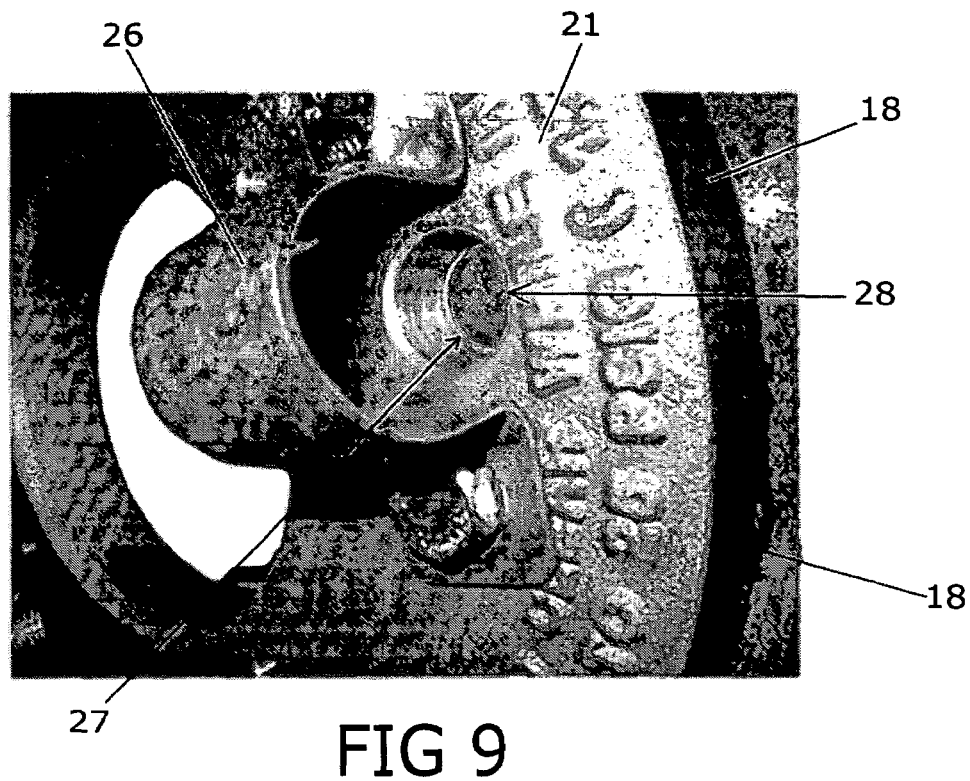
FIG. 9 is a close-up frontal view of the rupture disc holder of FIG. 5.
Figure 10:
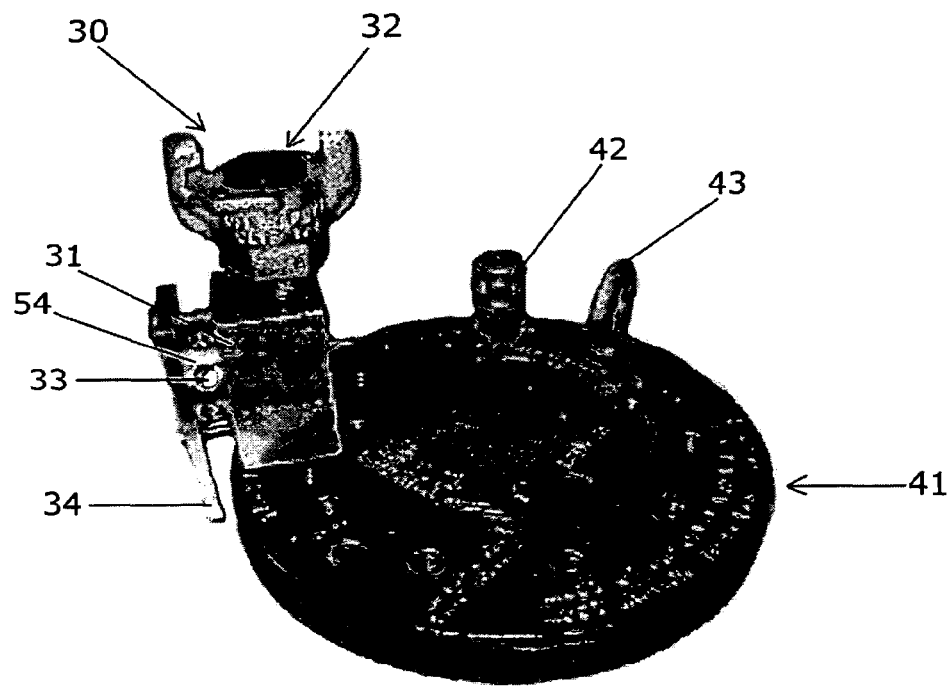
FIG. 10 is a top view showing another embodiment of the rupture disc assembly of the present invention.
Figure 11:
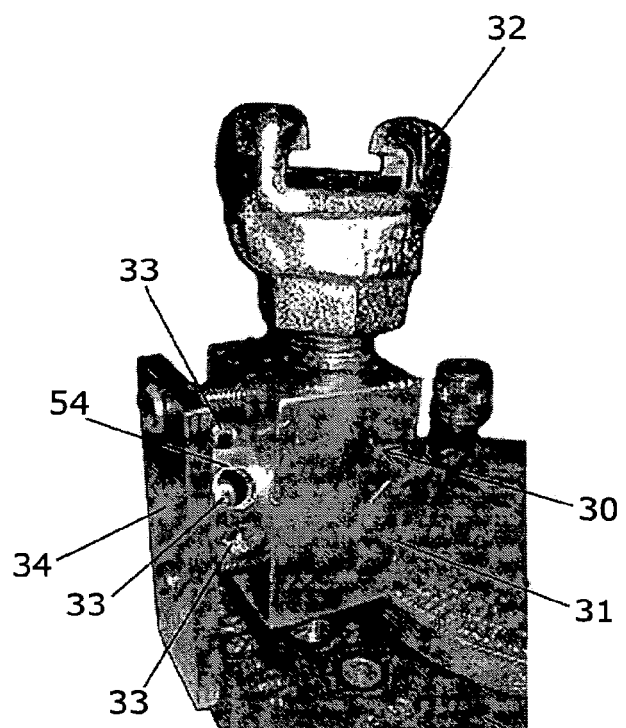
FIG. 11 is a lateral view showing the rupture disc assembly of FIG. 10.

As further shown in FIGS. 7 and 9, rupture disc 28, i.e., a disc constructed of a rupturable material, such as graphite or a scored metal or plastic disc structure, is positioned in the holder body 24. Although FIGS. 3 and 4 show one rupture disc structure, the graphite disc may have a concave cross-sectional configuration having a varying thickness, i.e., from ¼ to 1/16 inches from the periphery to the center, for example. A rigid disc structure having scored or weakened areas or lines may also be utilized. For example, metallic or polymeric discs having scored lines and a flat or curved, i.e., concave or domed structure may be used within the purview of the invention. A protective cover 26 is shown extending over aperture 27 to protect the rupture disc 20 from inadvertent damage, to prevent tampering and to direct fragmented pieces of a ruptured disc from being expelled outward in the line of sight. A warning label may be provided on the protective cover 26.

The rupture disc assembly 20 is shown constructed and arranged to prevent overinflation of pneumatic or sewer plugs by utilizing a rupture disc 28, i.e., constructed of a graphite disc structure that ruptures at a specified pressure that is below the ultimate burst pressure of the plug. The resultant opening in the rupture disc 28 the disc holder and the casting aperture is of sufficient size to expel air from the compressor to the plug so that the ultimate burst pressure of the pneumatic plug is not reached. Pneumatic plugs all have a safety factor typically of at least twice the required inflation pressure of the plug. The ultimate plug burst pressure is preferably greater than twice the required inflation pressure, for example. The disc is preferably set to rupture at approximately 90% of twice the required inflation pressure. This setting should prevent nuisance ruptures from slight overinflation due to gauge inaccuracies and vacuum testing. For example, a 24-48" pneumatic plug may have a required inflation pressure of approximately 22 psi. With the above described safety factor, the pneumatic plug's ultimate burst pressure will be greater than 44 psi. The rupture disc would therefore preferably be set to rupture at 40 psi (0.9×2×22 psi=40 psi).

Referring to FIGS. 10-14, end casting 41 is shown having a rupture disc assembly 30 mounted on the exterior thereof. The assembly 30 is shown comprised of holder body 31 having an air inflator portion or crow foot connector 32 which is constructed to receive an inflation hose connector. Compressed air flows through the holder body 31 through an aperture in the end casting 41 and into the plug interior. The rupture disc 36 with periphery 37 is mounted within the holder body 31 by means of a flanged holder 54, for example. The flanged holder structure 54 is shown to have a plurality of peripheral vent holes 33 and is shown extending from the holder body 31. A plate 34 is shown positioned and spaced outward from body 31 to prevent relative movement of the holder body 31 with respect to the end casting. The plate 34 utilizing tamper-resistant bolts, for example, further prevents tampering and redirects any fragmented disc pieces that may be ejected from the assembly upon rupture.

Figure 12:
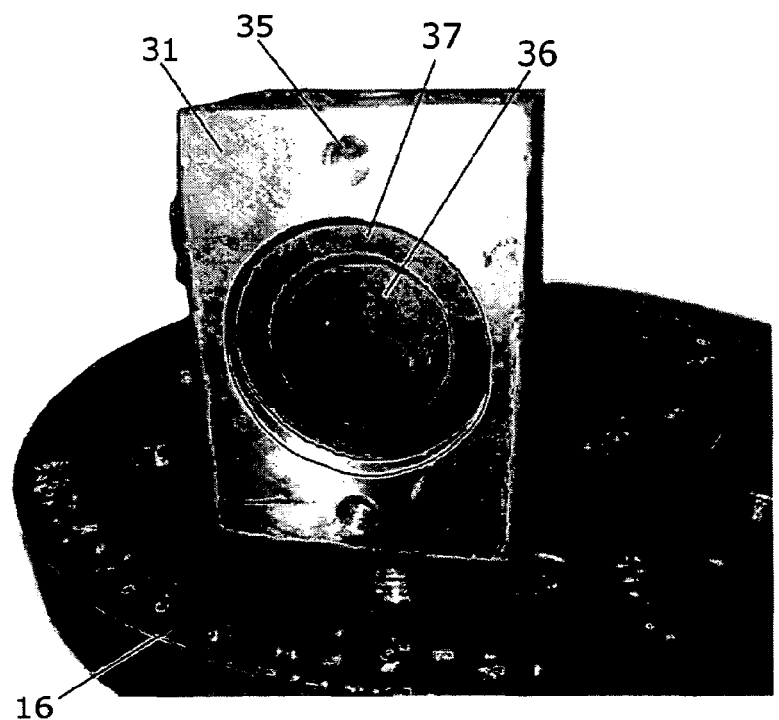
FIG. 12 is a lateral view showing the rupturable disc in the disc holder.
Figure 13:
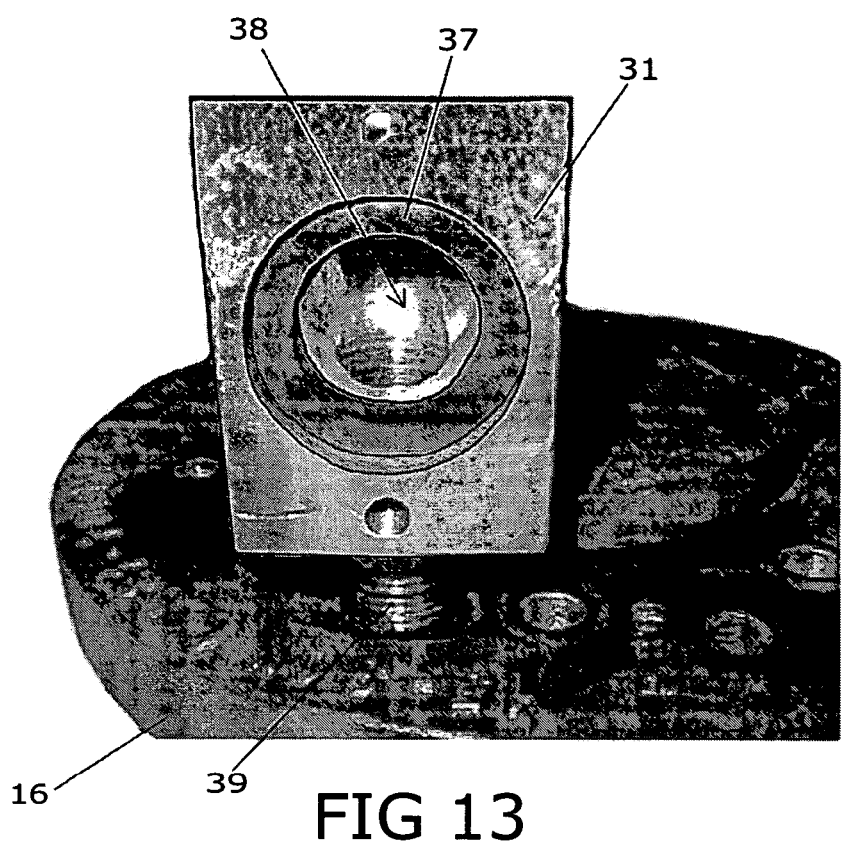
FIG. 13 is a view showing a ruptured disc in the disc holder.
Figure 14:
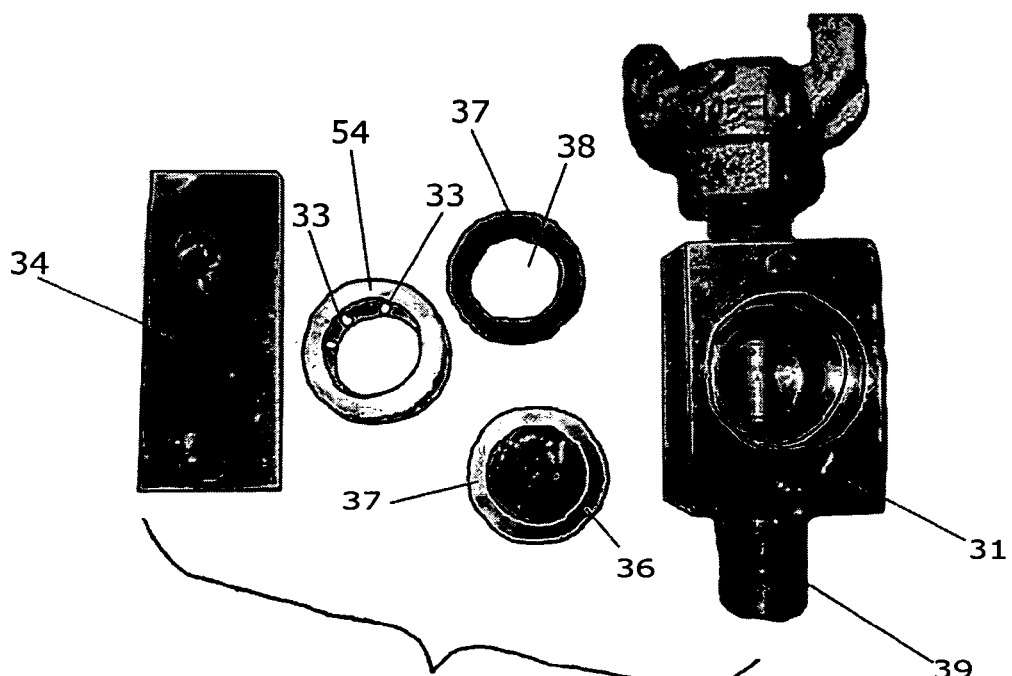
FIG. 14 is a top view showing the various elements of the rupture disc assembly of the invention.

As shown particularly in FIG. 12, rupture disc 36, with periphery 37, is mounted in holder body 31, whereas in FIG. 13 the rupture disc is shown fractured with only periphery 37 remaining. FIG. 14 shows the rupture disc assembly 30 in a disassembled state and showing rupture disc central portion 36 intact and a central portion 38 fractured from periphery 37. Although not shown, an O-ring is preferably positioned in the internally flanged body 31 to sealingly hold the rupture disc 36 when holder structure 54 is secured and pressed by plate 34 by means of the bolts upon assembly. This embodiment is essentially constructed to function in generally the same manner as described above with respect to FIGS. 5-9.

As many changes are possible to the embodiments of this invention utilizing the teachings thereof, the descriptions above and the accompanying drawings should be interpreted in the illustrative and not in the limited sense.

That which is claimed is:

1. A removable rupture disc assembly for a pneumatic plug having an end casting with a threaded aperture, said removable rupture disc assembly comprising:
   a) a separable rupture disc holder structure having a two-part body structure comprising a cylindrical flanged body with a formed top portion having an internally threaded cavity with an annular seat, said top portion of said cylindrical flanged body having an elongated threaded end extending therefrom for threading into the aperture in the end casting of the pneumatic plug, and a cooperating externally threaded body to engage said internally threaded cavity, said flanged holder body and said cooperating threaded body each having aligned bores extending therethrough;
   b) a rupturable disc member having a U-shaped cross-sectional configuration and being positioned on said annular seat in said flanged holder body, said rupturable disc member being constructed and arranged to burst at a predetermined pressure and to provide a sufficient volumetric airflow for pressure relief from the pneumatic plug; and
   c) an O-ring positioned between said rupturable disc member and said annular seat of said flanged portion of said flanged holder body.

2. The rupture disc assembly of claim 1, wherein said rupturable member comprises a wafer structure constructed of a graphite composition having a generally round configuration and wherein its center is thinner than its outside periphery.

3. The rupture disc assembly of claim 1, wherein said top portion of said flanged holder body has a formed exterior constructed and arranged to be engaged by a tool for threadingly mounting in and removing said rupture disc assembly from the end casting of a pneumatic plug.

4. The rupture disc assembly of claim 3, wherein said formed exterior of said flanged holder body is hexagonal in shape and wherein said rupturable disc member has a burst pressure of approximately 90% of twice the recommended inflation pressure of the pneumatic plug.

5. The rupture disc assembly of claim 1, wherein said flanged body is positioned on the inside of the end casting of the of the pneumatic plug.

6. The rupture disc assembly of claim 1, wherein said flanged body is positioned on the outside of the end casting of the pneumatic plug and wherein a protective cover member is positioned on the outside of said rupture disc assembly flange.

7. The rupture disc assembly of claim 6, wherein said protective cover member has tamper-proof bolts for connecting to the outside of the end casting of the pneumatic plug.

8. A removable rupture disc assembly for a pneumatic pipeline plug having an end plate with a threaded aperture comprising:
   a) a cylindrical disc holder body having an internally flanged cavity and a threaded body end extending therefrom, said threaded body end having a tapered threaded end for threading engagement with the threaded aperture of the end plate threaded aperture, said disc holder body further having a bore extending from said internal cavity to said threaded disc holder body end, said holder body having a formed exterior body portion constructed and arranged to turn said disc cylindrical holder body;
   b) a rupturable disc structure having a thickened periphery positioned in said internal cavity of said disc holder body, said periphery of said disc structure resting on said flange; and
   c) a cylindrical body member having a bore therethrough, said bore being aligned with said bore of said disc holder body, said cylindrical body member further having means for securement to secure said rupturable disc structure within said internal cavity of said disc holder body.

9. The rupture disc assembly of claim 8, wherein said rupturable disc structure is a graphite disc having a central disc portion and a peripheral edge and wherein said central disc portion is thinner than said peripheral edge.

10. The rupture disc assembly of claim 9, wherein said central disc portion of said disc structure, said disc holder body bore and said cylindrical body member bore are generally aligned and have generally the same diameter.

11. The rupture disc assembly of claim 10, wherein said internally flanged cavity has a peripheral edge and wherein an O-ring is interposed between said rupturable disc structure and said peripheral edge of said internal cavity of said disc holder body to provide a sealed rupture disc assembly.

12. The rupture disc assembly of claim 8, wherein a protective cover is provided, said protective cover being spaced from and generally aligned with said disc holder body.

13. The rupture disc assembly of claim 8, wherein said internal cavity of said disc holder body is internally threaded and wherein said means for securement of said cylindrical body member comprises external threads.

14. The rupture disc assembly of claim 8, wherein said formed body portion is hexagonal in configuration.

15. A removable rupture disc assembly for a pneumatic plug having an end casting with a threaded aperture therethrough, said rupture disc assembly comprising:
   a) a disc holder structure having a first body member with a centrally disposed bore and a second body member with a centrally disposed bore aligned with said bore of said first body member, said first body member having a formed exterior for engagement by a tool and having a tubular tapered threaded end for engaging and mounting in said threaded aperture in said end casting and further having an internally flanged threaded end for engaging said second body member;
   b) a rupture disc structure having a generally circular configuration having a periphery and a central area, said peripheral thickness of said disc structure being greater than the thickness of said center area, said rupture disc positioned in said internally flanged end of said first body member;
   c) said second body member having a first end threaded for engaging said first body member and holding said rupture disc structure in said internally flanged end of said first body member; and
   d) means to engage said first body member for turning said rupture disc assembly with respect to said end casting and to permit separation of the first and second body members.

16. The rupture disc assembly of claim 15, wherein an O-ring seal is provided in said internally flanged end of said first body member for engaging the periphery of said rupture disc structure.

17. The rupture disc assembly of claim 15, wherein said rupture disc structure is comprised of graphite.

18. The rupture disc assembly of claim 15, wherein said rupture disc structure is comprised of concentric circles and wherein said outside concentric circles form said peripheral area.

19. The rupture disc assembly of claim 18, wherein said central area of said disc is generally uniform and provides a substantially larger area for opening and providing a pressure release area.

20. The rupture disc assembly of claim 18, wherein said central area is generally the same diameter as said bores of said first and second body members.

* * * * *